United States Patent
Matsumoto

(10) Patent No.: US 6,785,297 B2
(45) Date of Patent: Aug. 31, 2004

(54) SDH SIGNAL GENERATOR

(75) Inventor: Hisashi Matsumoto, Atsugi (JP)

(73) Assignee: Anritsu Corporation, Tokyo (JP)

( * ) Notice: Subject to any disclaimer, the term of this patent is extended or adjusted under 35 U.S.C. 154(b) by 777 days.

(21) Appl. No.: 09/756,027

(22) Filed: Jan. 5, 2001

(65) Prior Publication Data

US 2001/0008537 A1 Jul. 19, 2001

(30) Foreign Application Priority Data

Jan. 19, 2000 (JP) ........................................ 2000-011012

(51) Int. Cl.[7] ............................................... H04J 3/24
(52) U.S. Cl. ...................................... 370/474; 370/509
(58) Field of Search .............................. 370/389, 395.1, 370/395.7, 395.71, 395.72, 403, 404–6, 412, 458, 463, 470–474, 476, 498, 503, 509–514, 523, 532, 535, 537–9; 398/45, 58, 115–6, 135–9, 175

(56) References Cited

U.S. PATENT DOCUMENTS 5,777,998 A  *  7/1998  Traverso et al. ............ 370/509
6,094,737 A  *  7/2000  Fukasawa .................... 714/738
6,157,658 A  * 12/2000  Toyoyama et al. .......... 370/505
6,385,213 B1 *  5/2002  Nakamura et al. .......... 370/513
2002/0024699 A1 * 2/2002  Tomooka et al. ........... 359/134

* cited by examiner

Primary Examiner—David Vincent
(74) Attorney, Agent, or Firm—Frishauf, Holtz, Goodman & Chick, P.C.

(57) ABSTRACT

A SDH signal generation portion generates and outputs an SDH signal by increasing/decreasing the AU point values contained in the SDH signal, using a sequence pattern made of a plurality of arbitrary combinations of basic patterns, a single basic pattern being made of changing the AU pointer values successively for a predetermined repetition number of times with the same increase/decrease type and repetition cycle. A memory stores in a different memory area for each basic pattern, taking the increase/decrease type, repetition cycle and repetition number of times as one set of basic pattern information, for basic patterns used in the SDH signal generation portion, and, stores an address designating a memory area storing the basic pattern information of the basic pattern following its own basic pattern for respective basic pattern.

4 Claims, 4 Drawing Sheets

SDH SIGNAL GENERATOR

CROSS-REFERENCE TO RELATED APPLICATIONS

This application is based upon and claims the benefit of priority from the prior Japanese Patent Application No. 2000-011012, filed Jan. 19, 2000, the entire contents of which are incorporated herein by reference.

BACKGROUND OF THE INVENTION

The present invention relates to a SDH signal generator, and particularly a SDH signal generator for generating and outputting a SDH signal by increasing/decreasing the AU pointer value contained in that SDH signal by an arbitrary sequence pattern, wherein the sequence pattern can be modified easily.

In the prior art, as shown in FIG. 6, in the STM (synchronized transfer mode) system, data is transferred using a SDH (synchronized digital hierarchy) signal wherein 1 frame is composed of a SOH (section overhead) portion of 9×9 bytes and a payload portion of 9×261 bytes.

A value A indicating the information leading head position of the payload portion is inserted as AU (administrative unit) pointer value at the fourth byte of SOH portion of this frame.

In such a system wherein frames are transferred continuously, a phenomenon that the information leading head position of the payload portion is shifted gradually from the position specified by the AU pointer of the initial frame due to the frequency difference between signals during the multiplexing of information of the payload portion, occurs.

To prevent this position shifting, in the STM system of the prior art, data is transferred by adjusting the information leading head position always at the position indicated by the AU pointer, by increasing/decreasing the AU pointer value of the SDH signal.

Consequently, it is necessary to test the response of the transfer system to the AU pointer increase/decrease change, when transfer system is constructed or maintained.

This AU pointer increase/decrease is often executed in a burst shaped pattern, such as increasing the AU pattern by one for Na times successively at a certain repetition cycle ΔTA, and then decreasing the AU pattern by one for Nb times successively at a certain repetition cycle ΔTb.

Thus, in the SDH signal generator of the prior art, wherein the AU pointer generates SDH signal increasing/decreasing with a predetermined pattern, for instance, a pointer sequence generation circuit 10 as shown in FIG. 8 is used.

This pointer sequence generation circuit 10 is composed of setting means 11, first clock means 12 and counting means 13, second clock means 14 and increase/decrease timing output means 15.

The first clock means 12 outputs an output instruction signal to the counting means and the increase/decrease timing output means 15, each time a predetermined time set by the setting means previously has elapsed, from the start until the counting means 13 inputs a number of times completion signal.

The counting means 13 counts the output instruction signal from the first clock means 12, and outputs the number of times completion signal to the first clock means 12 and the second clock means 14, when the number of times set by the setting means 11 previously is completed.

The second clock means 14 outputs a next pattern start signal to the first clock means 12, counting means 13 or increase/decrease timing output means 15, when the time set by the setting means 11 previously has elapsed from the time of reception of the number of times completion signal from the counting means 13.

The first clock means 12 resumes to output the output instruction signal by this next pattern start signal, and the counting means 13 resumes the counting.

Upon the reception of output instruction signal from the first clock means 12, the increase/decrease timing output means 15 outputs a signal indicating the pointer increase timing or a signal indicating the pointer decrease timing fixedly, or alternatively each time when the next pattern start signal from the second clock means 14 is received.

However, as the aforementioned pointer sequence generation circuit lacks flexibility of patterns that can be output, it is necessary to install several set of the circuits for several various sequences, resulting in complication and large-sizing, and moreover, it has been difficult to response to a new sequence.

BRIEF SUMMARY OF THE INVENTION

An object of the present invention is to provide a SDH signal generator that can solve the problems mentioned above, flexible of sequence patterns to generate, and capable of responding easily to new sequences.

In order to achieve the aforementioned object, according to an aspect of the present invention, there is provided a SDH signal generator, comprising:

a SDH signal generation portion for generating and outputting an SDH signal by increasing/decreasing AU point values contained in the SDH signal, using a sequence pattern made of a plurality of arbitrary combinations of basic patterns, a single basic pattern being made of changing the AU pointer values successively for a predetermined repetition number of times with the same increase/decrease type and repetition cycle; and a memory storing in a different memory area for each basic pattern, taking the increase/decrease type, repetition cycle and repetition number of times as one set of basic pattern information, for basic patterns used in the SDH signal generation portion, and, storing an address designating the memory area storing the basic pattern information of the basic pattern following its own basic pattern for respective basic pattern.

In order to achieve the aforementioned object, according to another aspect of the present invention, there is provided a SDH signal generator, comprising:

a SDH signal generation portion for generating and outputting an SDH signal by increasing/decreasing AU point values contained in the SDH signal, using a sequence pattern made of a plurality of arbitrary combinations of basic patterns, a single basic pattern being made of changing the AU pointer values successively for a predetermined repetition number of times with the same increase/decrease type and repetition cycle;

a memory storing in a different memory area for each basic pattern, taking the increase/decrease type, repetition cycle and repetition number of times as one set of basic pattern information, for basic patterns used in the SDH signal generation portion, and, storing an address designating a memory area storing the basic pattern information of the basic pattern following its own basic pattern for respective basic pattern;

clock means for outputting an output instruction signal for instructing to output the increase/decrease timing output for increasing/decreasing the AU pointer value each time when a predetermined time has elapsed;

increase/decrease timing output means for outputting a predetermined increase/decrease timing, each time when the output instruction signal is output from the clock means;

counting means for outputting a pattern changeover signal when the output instruction signal is output by the predetermined set number of times, from the clock means; and parameter setting means for reading out a pattern information stored in a predetermined memory area of the memory upon the reception of a predetermined start signal, setting a repetition cycle contained in the read out pattern information in the clock means as the setting time, setting the increase/decrease timing contained in the read out pattern information in the increase/decrease timing output means, setting the repletion number of times contained in the read out pattern information in the counting means, reading out the pattern information stored in the memory area of the memory designated by the address of the next basic pattern contained in the read out pattern information, upon the reception of the pattern changeover signal from the counting means, and setting respectively in the clock means, the increase/decrease timing output means and the counting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
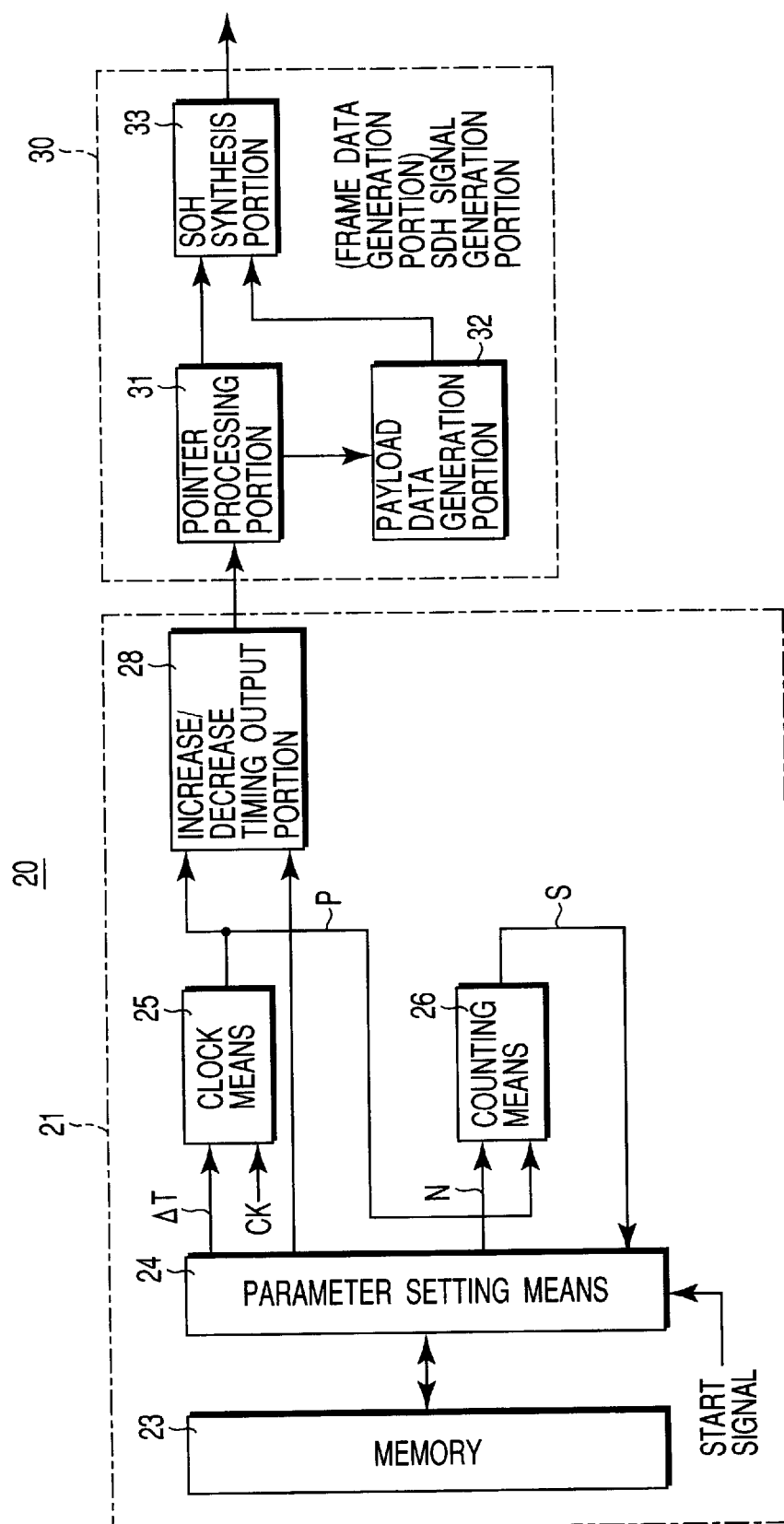
FIG. 1 is a block diagram showing a configuration on one embodiment of the SDH signal generator of the present invention.

Reference will now be made in detail to the presently preferred embodiment of the invention as illustrated in the accompanying drawing, in which like reference numerals designate like or corresponding parts.

First, the outline of the present invention will be described.

The SDH signal generator of the present invention comprises a pointer sequence generation portion (21) for outputting an increase/decrease timing according to a desired sequence pattern, and a SDH signal generation portion (30) including a frame data generation portion for generating and outputting as SDH signal including a frame data wherein the AU point value increases/decreases according to the increase/decrease timing output from the pointer sequence generation portion.

There, the pointer sequence generation portion is characterized by being composed of a memory (23) storing in a different memory area for each basic pattern, taking a pattern for changing the AU pointer with the same increase/decrease type and repetition cycle for a predetermined repetition number of times as one common pattern, and an address designating the information memory area of the increase/decrease type, repetition cycle and next pattern for respective common pattern constituting the desired pointer sequence, clock means (25) for outputting an output instruction signal for instructing to output the increase/decrease timing output each time when a predetermined time has elapsed, increase/decrease timing output means (28) for outputting a predetermined increase/decrease timing, each time when the output instruction signal is output from the clock means, counting means (26) for outputting a pattern changeover signal when the output instruction signal is output by the predetermined set number of times, from the clock means, and parameter setting means (24) for reading out a pattern information stored in a predetermined memory area of the memory upon the reception of a predetermined start signal, setting a repetition cycle contained in the read out pattern information in the clock means as the setting time, setting the increase/decrease timing contained in the read out pattern information in the increase/decrease timing output means, setting the repletion number of times contained in the read out pattern information in the counting means, reading out the pattern information stored in the memory area of the memory designated by the address of the next common pattern contained in the read out pattern information, upon the reception of the pattern changeover signal from the counting means, and setting respectively in the clock means, the increase/decrease timing output means and the counting means.

Now, the embodiment of the present invention based on the outline mentioned above will be described referring to the drawings.

FIG. 1 is a block diagram showing a configuration on one embodiment of the SDH signal generator of the present invention.

A shown in FIG. 1, the SDH signal generator according to this embodiment comprises a pointer sequence generation portion 21, and a SDH signal generation portion 30 including a frame data generation portion for generating and outputting SDH frame data as SDH signal.

The SDH signal generation portion 30 having a frame data generation portion generates and outputs a SDH signal containing SDH frame data by synthesizing AU pointer generated by a pointer processing portion 31 and payload data generated by a payload data generation portion 32 by means of a OSH synthesis portion 33.

The pointer processing portion 31 of the SDH signal generation portion 30 having this frame data generation portion increases/decreases the AU pointer values based on a signal containing increase/decrease timing and increase/decrease type from the pointer sequence generation portion 21.

In the following description, the signal containing increase/decrease timing, type of this increase/decrease and magnitude of increase/decrease timing shall be called increase/decrease timing.

The pointer sequence generation portion 21 is composed of memory 23, parameter setting means 24, clock means 25, counting means 26 and increase/decrease timing output means 28.

The memory 23 is composed of RAM or ROM and stores in a different memory area for each common pattern, taking a pattern for changing the AU pointer with the same AU pointer increase/decrease type and repetition cycle for a predetermined repetition number of times as one common pattern, and type of increase/decrease (+/−) of this common pattern, repetition cycle $\Delta T$, repetition number of times N and leading head address A of the memory area storing the information of next generating common pattern as one set of pattern information.

Figure 2:
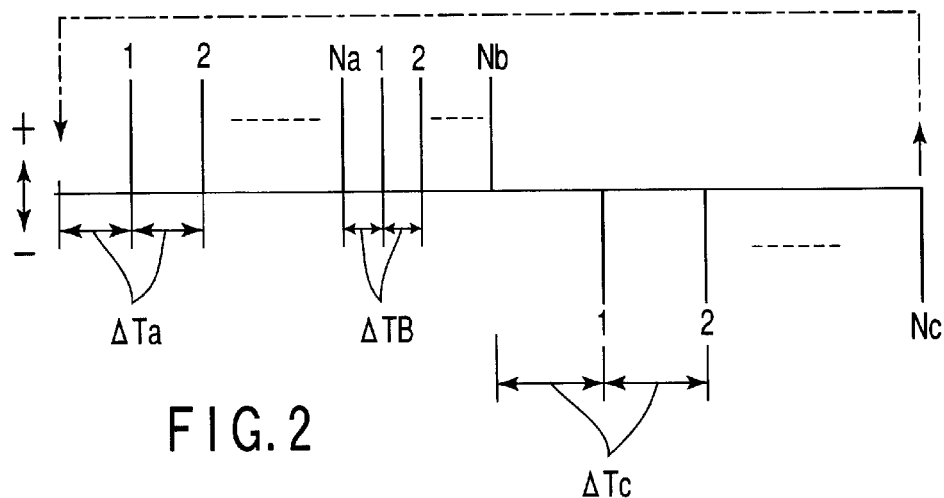
FIG. 2 is a pattern diagram showing an example of pointer sequence used for a pointer sequence generation portion of FIG. 1.

For instance, a case where the pointer value is increased by 1 with repetition cycle $\Delta Ta$ for successive Na times, then, the pointer value is increased by 1 with repetition cycle $\Delta Tb$ for successive Nb times, and then the pointer value is decreased by 1 with repetition cycle $\Delta Tc$ for successive Nc times and this sequence of operation is repeated, as the sequence pattern shown in FIG. 2, shall be described.

Figure 3:
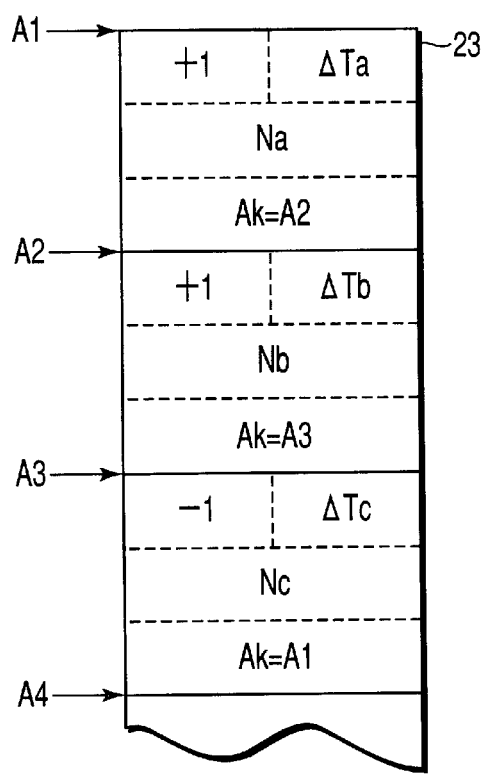
FIG. 3 shows the memory contents of the memory of FIG. 1.
Figure 5:
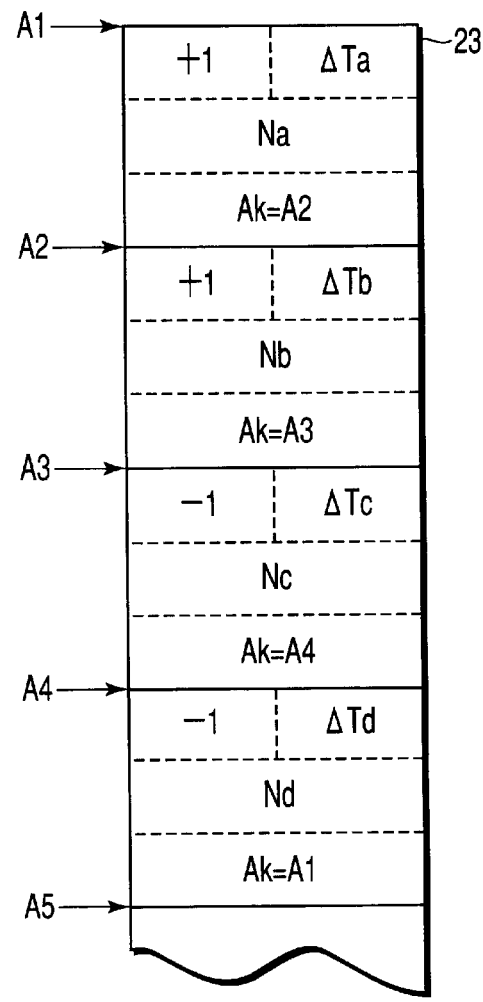
FIG. 5 shows the memory contents of the memory when the pointer sequence used for the pointer sequence generation portion of FIG. 1 is changed.

In this case, the operation to increase the pointer value by 1 with repetition cycle $\Delta Ta$ for successive Na times is taken as one common pattern, and increase/decrease timing (+1), repetition cycle $\Delta Ta$, repetition number of times Na, and leading address Ak=A2 of the next common pattern are stored as one set of pattern information in the memory are of address A1 to A2−1 of the memory 23, as shown in FIG. 3.

Similarly, increase/decrease timing (+1), repetition cycle $\Delta Tb$, repetition number of times Nb, and leading address Ak=A3 of the following common pattern are stored as one set of pattern information in the memory are of address A2 to A3−1 of the memory 23.

Similarly, increase/decrease timing (−1), repetition cycle $\Delta Tc$, repetition number of times Nc, and leading address Ak=A1 of the following common pattern are stored as one set of pattern information in the memory are of address A3 to A4−1 of the memory 23.

Upon the reception of start signal from an operation portion not shown, the parameter setting means 24 reads out the information of the memory area designated by the address A1, sets the repetition cycle $\Delta T$ to the clock means 25, sets the repetition number of times N to the counting means 26, and sets the increase/decrease timing to the increase/decrease timing output means 28.

Besides, when the counting means 25 outputs a pattern changeover signal E from the counting means 26, the parameter setting means 24 reads out the information of the area having the address designated by the address information read out from the memory 23 as leading head, sets the repetition cycle $\Delta T$ to the clock means 25, sets the repetition number of times N to the counting means 26, and sets the increase/decrease timing to the increase/decrease timing output means 28.

When the repetition cycle $\Delta T$ is set from the parameter setting means 24, the clock means 25 outputs an output designation signal P to the increase/decrease timing output means 28 each time the time $\Delta T$ elapses (each time when the reference clock CK is input $\Delta T$ times).

Here, the repetition cycle $\Delta T$ set in the memory 23 is value set taking the cycle Tr of the reference clock CK as unit time.

And, the cycle Tr of the reference clock CK is supposed to be set to integer number of times (for instance, 1 msec which is 8 times) of SDH frame cycle (for instance, 125 $\mu$sec).

The counting means 26 counts the number of times of output of output designation signal P output from the clock means 25, and outputs a pattern changeover signal E to the parameter setting means 24 when this number of times of output agrees with the repetition number of times N set from the parameter setting means 24.

The increase/decrease timing output means 28 outputs the increase/decrease timing set by the parameter setting means 24 to the pointer processing portion 31 of the SDH signal generation portion 30 having the frame generation portion, each time it receives the output designation signal P output from the clock means 25.

Next, the operation of SDH signal generator 20 composed as mentioned above shall be described.

Beforehand, suppose that the sequence date is set in the memory 23 as shown in FIG. 3.

In this state, when the start signal is input, the parameter setting means 24 reads out increase/decrease timing (+1), repetition cycle $\Delta Ta$, repetition number of times Na, and the following address A2 from the memory area having the address A1 as leading head, sets the increase/decrease timing (+1) to the increase/decrease timing output means 28, sets the repetition cycle $\Delta Ta$ to the clock means 25, and sets the repetition number of times Na to the counting means 26.

Figure 4A:
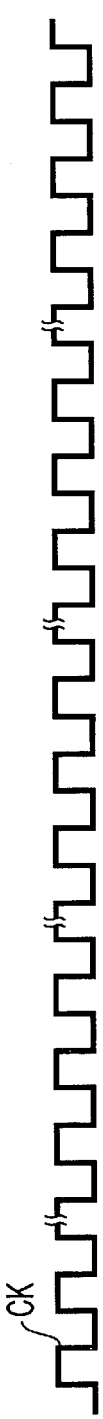
FIGS. 4A to 4G are timing diagrams illustrating the operation of the SDH signal generator of FIG. 1.
Figure 4B:
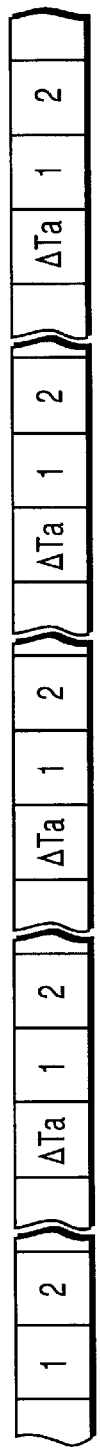
Figure 4C:

The clock means 25 receives the reference clock CK shown in FIG. 4A, starts to count the reference clock CK from the time when the repetition cycle $\Delta Ta$ is set from the parameter setting means 24 as shown in FIG. 4B, and outputs the designation signal P each time when $\Delta Ta$ times of reference clock CK are input.

Figure 4D:
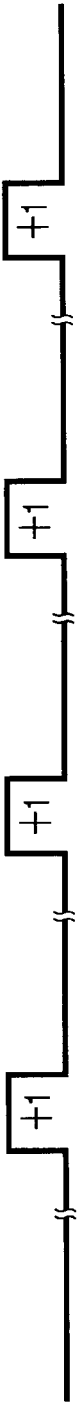

Upon the reception of this designation signal P, the increase/decrease timing output means 28 outputs a increase/decrease timing (+1) to increase the AU pointer value by 1, to the SDH signal generation portion 30 having the frame generation portion, as shown in FIG. 4D.

Figure 4E:
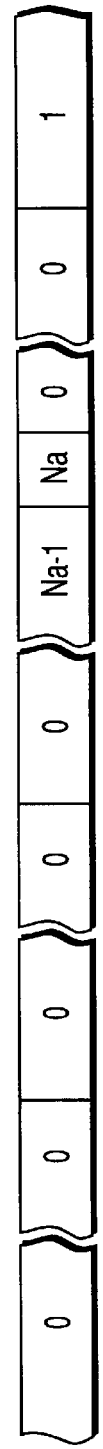
Figure 4F:
Figure 4G:
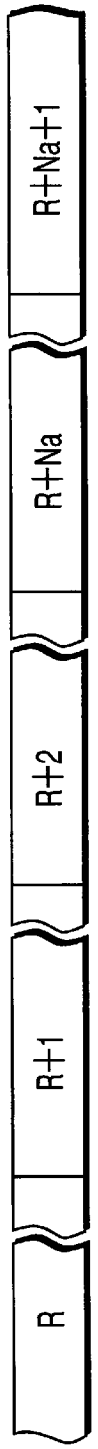
Figure 6:
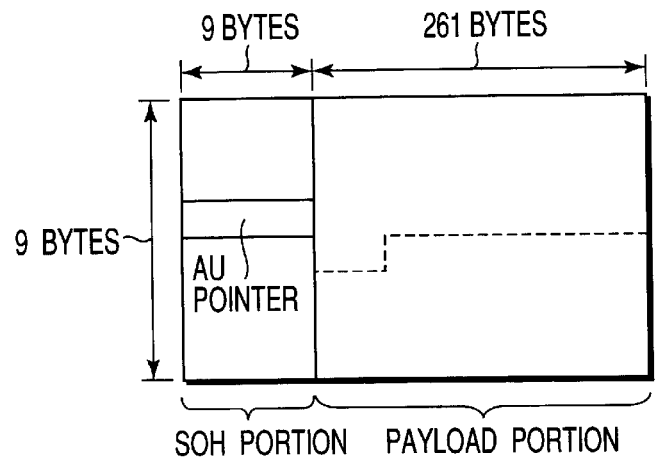
FIG. 6 is a SDH frame configuration diagram shown for illustrating the prior art.
Figure 7:
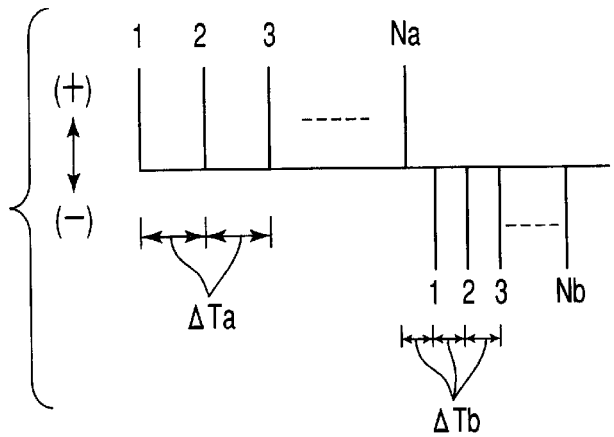
FIG. 7 is a pattern diagram showing an example of pointer sequence shown for illustrating the prior art.
Figure 8:
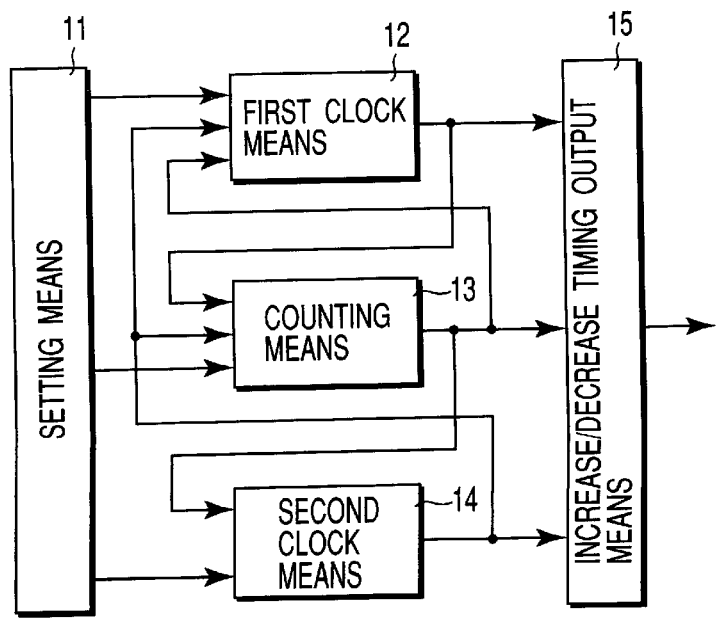
FIG. 8 is a block diagram showing a configuration of essential parts of an SDH signal generator of the prior art.

Consequently, the AU pointer value of SDH frame data output from the SDH signal generation portion 30 having the frame generation portion increases from the previous pointer value R to (R+1), (R+2), (R+3), . . . and so on successively by one, as shown in FIG. 4G.

On the other hand, upon the reception of designation signal P from the clock means 25, the counting means counts this designation signal P as shown in FIG. 4E, and when the counting result of designation signal P attains Na, outputs a pattern changeover signal E to the parameter setting means 24.

Upon the reception of this pattern changeover signal E, the parameter setting means 24 reads out increase/decrease timing (+1), repetition cycle $\Delta Tb$, repetition number of times Nb, and the following address A3 stored in the memory area having the address A2 as leading head from the memory 23, sets the increase/decrease timing (+1) to the increase/decrease timing output means 28, sets the repetition cycle $\Delta Tb$ to the clock means 25, and sets the repetition number of times Nb to the counting means 26.

As a result, the clock means 25 outputs the designation signal P as before, and a increase/decrease timing (+1) is output to the SOH data generation portion, synchronized with this designation signal P, and the AU pointer value of SDH frame data output from the SDH signal generation portion 30 having the frame generation portion increases (R+Na+1), (R+Na+2), (R+Na+3), ... and so on successively by one.

Though not shown, the operation thereafter is a repetition of the aforementioned operation.

Namely, when Nb th designation signal P is output, the counting means 26 outputs a pattern changeover signal E to the parameter setting means 24, and upon the reception of this designation signal P, the parameter setting means 24 reads out increase/decrease timing (−1), repetition cycle ΔTc, repetition number of times Nc, and the following address A1 stored in the memory area having the address A3 as leading head from the memory 23, sets the increase/decrease timing (−1) to the increase/decrease timing output means 28, sets the repetition cycle ΔTc to the clock means 25, and sets the repetition number of times Nc to the counting means 26.

Consequently, as mentioned above, the clock means 25 outputs designation signal P at the repetition cycle ΔTc successively Nc times, and a increase/decrease timing (−1) is output to a 0 pointer processing portion 31 of the SDH signal generation portion 30 having the frame generation portion, synchronized with this designation signal P.

Consequently, the AU pointer value of SDH frame data output from the SDH signal generation portion 30 having the frame generation portion decreases as (R+Na +Nb−1), (R+Na+Nb−2), (R+Na+Nb−3), ... and so on successively by one.

When Nc th designation signal P is output, and a pattern changeover signal E is output from the counting means 26, the parameter setting means 24 reads out increase/decrease timing (+1), repetition cycle ΔTa, repetition number of times Na, and the following address A2 from the memory area having the address A1 as leading head, sets the increase/decrease timing (+1) to the increase/decrease timing output means 28, sets the repetition cycle ΔTa to the clock means 25, and sets the repetition number of times Na to the counting means 26.

Thereafter, the same operation is repeated, and the AU pointer value of SDH frame data output from the SDH signal generation portion 30 having the frame generation portion increases/decreases according to the sequence pattern shown in FIG. 2 mentioned above.

This sequence pattern can be modified easily by changing a part of memory contents of the memory 23.

For instance, if a sequence pattern made of four kinds of common pattern it to be repeated by adding to the last a new common pattern different from the aforementioned three kinds of common patterns, the following pattern address of the memory area having the address A3 of the memory 23 as leading head may be set as A4, and a new common pattern increase/decrease timing (−1), repetition cycle ΔTd, repetition number of times Nd and next pattern address A1 memory set to the memory area of address A4 to A5−1.

In the embodiment, the pattern information is stored in the memory area specified by the address of the memory 23 that the parameter setting means 24 accesses first upon the reception of start signal.

However, so that the first generated pattern can be changed, the leading head address of the memory area storing information of the pattern to be generated first may be set to the address at which the parameter setting means 24 accesses the memory 23 first, and the pattern information stored in the memory area specified by this leading head address may be read out and set.

Thus, in the SDH signal generator 20 of this embodiment, as the pattern information of a plurality of common patterns constituting a sequence pattern is set into the memory 23 as a block, and they are changed over according to the next pattern address information specified by respective pattern information, the configuration is simple, and moreover, the whole sequence pattern can be modified by changing only a part of data, and the sequence pattern can be modified easily.

As mentioned hereinbefore, in the present invention, as the pattern information of a plurality of common patterns constituting a sequence pattern is set into the memory as a block, and they are changed over according to the next pattern address information specified by respective pattern information, a SDH signal generator of simple configuration, flexible about the sequence pattern to generate, and capable of responding easily to a new sequence pattern can be supplied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A SDH signal generator, comprising:
   a SDH signal generation portion for generating and outputting an SDH signal by increasing/decreasing AU point values contained in the SDH signal, using a sequence pattern made of a plurality of arbitrary combinations of basic patterns, a single basic pattern being made of changing the AU pointer values successively for a predetermined repetition number of times with the same increase/decrease type and repetition cycle; and
   a memory storing in a different memory area for each basic pattern, taking said increase/decrease type, repetition cycle and repetition number of times as one set of basic pattern information, for basic patterns used in said SDH signal generation portion, and, storing an address designating a memory area storing the basic pattern information of the basic pattern following its own basic pattern for respective basic pattern.

2. A SDH signal generator according to claim 1, wherein said SDH signal generation portion includes a frame data generation portion; and
   said frame data generation portion includes a pointer processing portion generating AU pointer based on said basic pattern information from said memory, a payload data generation portion for generating payload data according to AU pointer from said pointer processing portion, and a SOH synthesis portion for multiplexing the AU pointer from said pointer processing portion and the payload data from said payload data generation portion and generating and outputting as SDH signal containing frame data of SDH.

3. A SDH signal generator, comprising:
   a SDH signal generation portion for generating and outputting an SDH signal by increasing/decreasing the AU point values contained in the SDH signal, using a sequence pattern made of a plurality of arbitrary combinations of basic patterns, a single basic pattern being made of changing the AU pointer values successively for a predetermined repetition number of times with the same increase/decrease type and repetition cycle;

a memory storing in a different memory area for each basic pattern, taking said increase/decrease type, repetition cycle and repetition number of times as one set of basic pattern information, for basic patterns used in said SDH signal generation portion, and, storing an address designating a memory area storing the basic pattern information of the basic pattern following its own basic pattern for respective basic pattern;

clock means for outputting an output instruction signal for instructing to output the increase/decrease timing output for increasing/decreasing the AU pointer value each time when a predetermined time has elapsed;

increase/decrease timing output means for outputting a predetermined increase/decrease timing, each time when the output instruction signal is output from said clock means;

counting means for outputting a pattern changeover signal when the output instruction signal is output by the predetermined set number of times, from said clock means; and parameter setting means for reading out a pattern information stored in a predetermined memory area of said memory upon the reception of a predetermined start signal, setting a repetition cycle contained in the read out pattern information in said clock means as said setting time, setting the increase/decrease timing contained in the read out pattern information in said increase/decrease timing output means, setting the repletion number of times contained in the read out pattern information in said counting means, reading out the pattern information stored in the memory area of said memory designated by the address of the next basic pattern contained in said read out pattern information, upon the reception of said pattern changeover signal from said counting means, and setting respectively in said clock means, said increase/decrease timing output means and said counting means.

4. A SDH signal generator according to claim 3, wherein said SDH signal generation portion includes a frame data generation portion; and said frame data generation portion includes a pointer processing portion generating AU pointer based on said increase/decrease timing from said increase/decrease timing output means, a payload data generation portion for generating payload data according to AU pointer from said pointer processing portion, and a SOH synthesis portion for synthesizing the AU pointer from said pointer processing portion and the payload data from said payload data generation portion and generating and outputting as SDH signal containing frame data of SDH.

* * * * *